United States Patent Office 3,446,833
Patented May 27, 1969

3,446,833
CATALYTIC AMMOXIDATION OF
OLEFINS TO NITRILES
Enrico Cavaterra, Natale Ferlazzo, and Guido Petrini,
Milan, Italy, assignors to Montecatini Edison S.p.A.,
Milan, Italy
No Drawing. Filed Dec. 19, 1966, Ser. No. 602,499
Claims priority, application Italy, Dec. 28, 1965,
28,834/65
Int. Cl. C07c *121/02, 121/32*
U.S. Cl. 260—465.3          10 Claims

ABSTRACT OF THE DISCLOSURE

A catalyst consisting essentially of cerium tellurite, and a process for the preparation of unsaturated nitriles by reacting an olefin, ammonia and oxygen in the presence of such catalyst.

BACKGROUND OF THE INVENTION

The present invention relates to catalysts and to a catalytic process for the production of nitriles, more particularly the invention relates to an improved process for the production of acrylonitrile and to particular catalysts for use in such process.

Processes are known in which an olefin is reacted with ammonia and oxygen in the presence of specific catalysts to obtain unsaturated nitriles.

The known catalysts include several elements in the form of acids or salts as for example, molybdic acid, phosphomolybdic acid and phosphotungstic acid; phosphoric acids activated by several elements, bismuth compounds, phosphorus, oxygen, vanadium and other elements.

Most of such processes do not afford however, fully satisfactory results. They exhibit a number of drawbacks as relatively low selectively i.e. a low yield of the desired unsaturated nitrile which is obtained, together with great quantities of by-products and carbon oxides.

Said by-products give rise to a lose in starting material and make difficult the recovery of the desired unsaturated nitrile in pure state.

Other drawbacks of the known processes are, generally, the low conversion of reactants and the necessity of using long contact times which consequently involve low productivity of the catalyst.

Said drawbacks can be overcome through the process of this inveniton, which process concerns the production of unsaturated aliphatic nitriles obtained through the reaction of an olefin with oxygen and ammonia. The process in accordance with this invention is carried out in the presence of catalysts affording high yields of unsaturated nitriles and high conversions of the reactants with relatively short contact times.

Furthermore, the catalysts according to this invention have a long life without exhibiting any decrease in their catalytic activity and without requiring any reactivation.

THE INVENTION

Therefore, an object of this invention is to provide a process for producing an unsaturated nitrile, which process comprises contacting a gaseous mixture of an olefin having three or four carbon atoms, ammonia and oxygen or an oxygen containing gas with a catalyst whose composition will be specified more fully hereafter, at a temperature ranging from 350° C. to 550° C. at a pressure around atmospheric pressure.

The catalysts according to this invention essentially consist of cerium tellurite having the formula $CeTe_3O_8$ either used alone or with a suitable carrier of conventional type, and can be used either in fixed or fluid bed.

$CeTe_3O_8$ can, as known, be prepared by intimately mixing $TeO_2$ with $CeO_2$, finely powdered, in the molar ratio 3:1, and carrying out a reaction in solid phase in preferably in an oxidizing atmosphere, at a temperature comprised from between 600° C. and 700° C. and a reaction time ranging from 2 to 30 hours.

The process object of this invention may be applied to propylene, in order to yield acrylonitrile, and to isobutene in order to obtain methacrylonitrile.

In this process it is preferable to use pure olefin, but it has also been found that the process can take place in the presence of paraffinic hydrocarbons inert to the process conditions, which act as diluents.

The oxygen necessary for the reaction can be fed, as such, or as an oxygen containing gas, as, for example, air. This latter may be more convenient either for strictly economic reasons or for the presence of nitrogen which accompanies the same and which acts as an inert diluent able to moderate the exothermic characteristics of the reaction.

The amount of oxygen or of the gas containing oxygen which may be used with respect to the olefin may vary within wide limits. The molar ratio oxygen: olefin is preferably comprised between about 1:1 and about 3:1.

Ammonia is used in quantities that may also vary within wide limits with respect to olefin. The molar ratio ammonia: olefin is, however, preferably comprised between about 0.6:1 and about 2:1. The high selectivity of the catalysts of this invention permits an almost total exploitation of the ammonia so that only a slight excess of ammonia with respect to the olefin is necessary in the reaction medium.

Atmospheric pressure is quite sufficient for conducting the reaction but the reaction can also be carried out at superatmospheric pressures.

The reaction temperature may be comprised within 330° C. and 550° C. but temperatures within 380° C. and 500° C. are preferable, since they permit high conversions under relatively short contact times, as the following examples will better illustrate.

The contact times may vary within wide limits, for example from 0.1 up to 20 seconds, but it has been found that, owing to the high activity of the catalyst, contact times lower than one second are generally enough to afford high conversions of reactants, so that the preferred contact time ranges between 0.5 and 15 seconds.

The catalysts according to this invention, when in association with a carrier, are prepared with a ratio active part: carrier variable within 15–50% by weight of active part, calculated as the sum of the oxides at the maximum valency and 85%–50% by weight of carrier.

Several substances, silica, alumina, alundum, fireclays and the like, may be used as a carrier, either in the form of suitably granulated powder or as granules, as well as gels of silica or alumina.

The results achieved by using a carrier made of commercial microspheroidal macroporous silica proved to be particularly suitable.

When it is desired to operate with said suitably supported catalysts, according to an embodiment of this invention, the impregnation of the carrier with the active part is performed as follows:

Cerous nitrate $Ce(NO_3)_3 \cdot 6H_2O$ and telluric acid $H_2TeO_4 \cdot 2H_2O$ are dissolved in water and in concentrated nitric acid.

The solution thus obtained is used for the impregnation of the silica which constituted the carrier after its volume has been rectified by adding water in such a quantity to make it equal to the volume of the pores of the silica to be impregnated.

The impregnation is carried out by slowly pouring the solution on the silica while kept under stirring. The impregnated silica is stirred for about one hour and it is then left to settle for eight hours. The mass is dried at 110° C. for a few hours. The silica impregnated in this way then undergoes heating at temperature comprised between 600° C. and 700° C. for a time from 2 up to 30 hours. This permits a reaction to take place within the silica, and through this reaction Te and Ce oxides are changed in a solid phase to $CeTe_3O_8$, in a substantially quantitative extent. The catalyst thus prepared exhibits high catalytic activity and a good selectivity.

In order to further illustrate the present invention and the advantages thereof, the following specific examples are given it being understood that the same are merely intended to be illustrative and in no wise limitative.

The results appearing in the examples have been ascertained by means chromatographic analysis of the outlet gases of the reactor or by means of quantitative analysis, volumetric and gravimetric, of the condensed products and by the analysis of the non-condensable elements, carried out by means of an Orsat apparatus.

The silica impregnated in this way was heated at 620° C. in the presence of air, for 8 hours: after this treatment Te and Ce oxides were converted into $CeTe_3O_8$ in a substantially quantitative extent.

The product obtained was used for the ammoxidation reaction of the olefin appearing in the following examples.

EXAMPLE 2

4.5 cc. equal to 2.7 g. of a catalyst prepared according to Example 1 were put into a microreactor constituted by a stainless steel pipe suitably heated to form a fixed bed. A gaseous mixture consisting of 8.33% by volume of propylene, 8.33% by volume of ammonia and 83.3% by volume of air was passed over the catalyst in such a quantity as to attain a contact time of 2.5 seconds of the mixture itself measured at the temperature and pressure conditions existing in the catalytic bed, with said catalyst.

The reaction was carried out at atmospheric pressure and at a temperature of 400° C.

The products of the reaction analyzed via gas chromatography displayed the following results calculated on the converted propylene:

Net yield: Percent
Acrylonitrile _____ 80
Acetonitrile _____ 3.1
$CO_2$ _____ 14.7
HCN _____ 3.2

The following table shows conditions and data relating to Examples 3, 4 and 5, obtained by working, as specified in Example 2.

TABLE

| Example No. | Ratios Air/propylene | Ratios $NH_3$/propylene | Contact time, seconds | Inner temperature, °C. | Percent conversion of propylene | Percent net yield Acrylonitrile | Acetonitrile | Acrolein | HCN | $CO_2$ | CO | Percent Gross yield of acrylonitrile |
|---|---|---|---|---|---|---|---|---|---|---|---|---|
| 3 | 10 | 1 | 2.5 | 440 | 65.5 | 75.8 | 2.4 | | 2 | 17.7 | 2.06 | 49.7 |
| 4 | do | do | do | 460 | 79 | 70.3 | 2.4 | | 2 | 22.7 | 2.5 | 55.6 |
| 5 | do | do | do | 440 | 58 | 76.8 | 2.3 | | 2 | 16.4 | 2.4 | 44.6 |

The terms herein used have the following meaning:

percent conversion of the olefin =

$$\frac{\text{mole of reacted olefin}}{\text{mole of olefin fed}} \times 100$$

Net yield or selectivity = percent yield of product X with reference to the converted olefin =

$$\frac{\text{weight of carbon in product X}}{\text{weight of carbon in the converted olefin}} \times 100$$

Gross yield = percent yield of product X with respect to the fed olefin =

$$\frac{\text{weight of carbon in product X}}{\text{weight of carbon in the olefin fed}} \times 100$$

contact time: the time during which a unit volume of the gaseous mixture fed, measured under the average temperature and pressure conditions in the reactor, remains in contact with the apparent unit volume of the catalyst.

EXAMPLE 1

15.6 g. cerous nitrate at 99.9% and 24.5 g. telluric acid at 98.5% were dissolved in 25 g. water and 10 g. nitric acid at 65%.

The resulting solution was slowly poured under stirring onto 73.6 g. microspheroidal macroporous silica of commercial type.

The stirring was then maintained for one hour and the mass was then left to settle for 8 hours; after which it was dried in a muffle at 110° C. for 12 hours.

It has been observed that by operating in the same way but in fluid bed altogether similar results were obtained, while it turned out that the thermal control of the course of the reaction was quite facilitated, especially when operating on an industrial scale.

What is claimed is:

1. A process for the conversion of an olefin selected from the group consisting of propylene and isobutylene to acrylonitrile and methacrylonitrile, respectively, comprising contacting a mixture of the said olefin, ammonia and elemental oxygen in the gaseous phase at a temperature of from about 330° C. to about 550° C., with an active catalyst consisting essentially of $CeTe_3O_8$.

2. The process as defined by claim 1, wherein the ratio of elemental oxygen to olefin in the reaction mixture ranges from between 1:1 to about 3:1, and further wherein the ratio of ammonia to olefin in the reaction mixture ranges from between about 0.6:1 to about 2:1.

3. The process as defined by claim 2, wherein the contacting time ranges from between about 0.1 second to about 20 seconds.

4. The process as defined by claim 3, wherein the reaction is conducted in fluid bed.

5. The process as defined by claim 3, wherein the reaction is conducted in the presence of an inert diluent.

6. The process as defined by claim 3, wherein the active catalyst is associated with about 85% to about 50% by weight of a support selected from the group consisting of silica, alumina, alundum and fireclay.

7. The process as defined by claim 6, wherein the support is silica.

8. The process as defined by claim 3, wherein the contacting time ranges from between about 0.5 second to about 15 seconds, at a temperature of from about 380° C. to about 500° C., and at a pressure of about atmospheric.

9. The process as defined by claim 3, wherein propylene is converted to acrylonitrile.

10. The process as defined by claim 3, wherein isobutylene is converted to methacrylonitrile.

References Cited

UNITED STATES PATENTS 3,226,421   12/1965   Giordano et al. ____ 260—465.3
3,338,952   8/1967   Callahan et al. _____ 260—465.3

JOSEPH P. BRUST, *Primary Examiner.*

U.S. Cl. X.R.

252—439

PO-1050
(5/69)

UNITED STATES PATENT OFFICE
CERTIFICATE OF CORRECTION

Patent No. 3,446,833          Dated May 27, 1969

Inventor(s) Enrico Cavaterra, Natale Ferlazzo and Guido Petrini

It is certified that error appears in the above-identified patent and that said Letters Patent are hereby corrected as shown below:

Column 1, line 43, change "lose" to -- loss --

Column 2, line 1, change "hereafter" to -- hereinafter --

Column 4, line 71, after "with" insert -- from --

SIGNED AND
SEALED
NOV 3 1970

(SEAL)
Attest:

Edward M. Fletcher, Jr.
Attesting Officer

WILLIAM E. SCHUYLER, JR.
Commissioner of Patents